Figure 21:
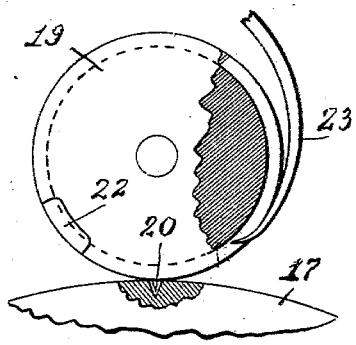

No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 1.
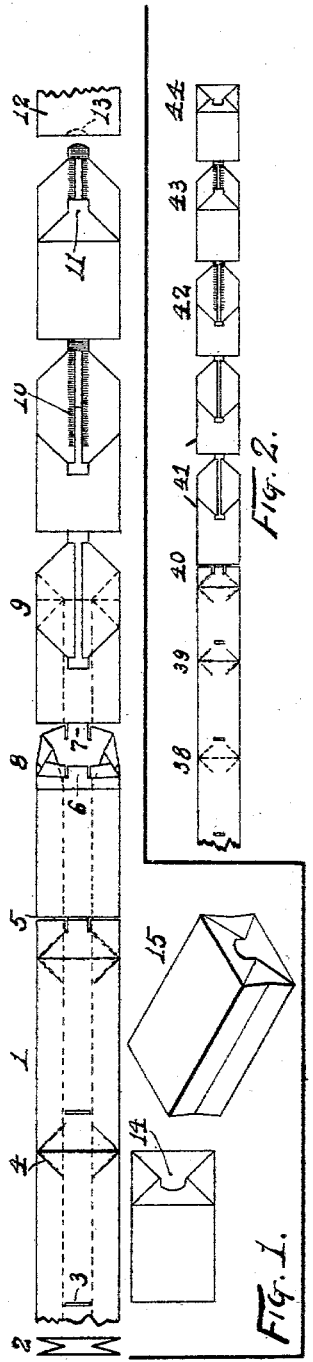
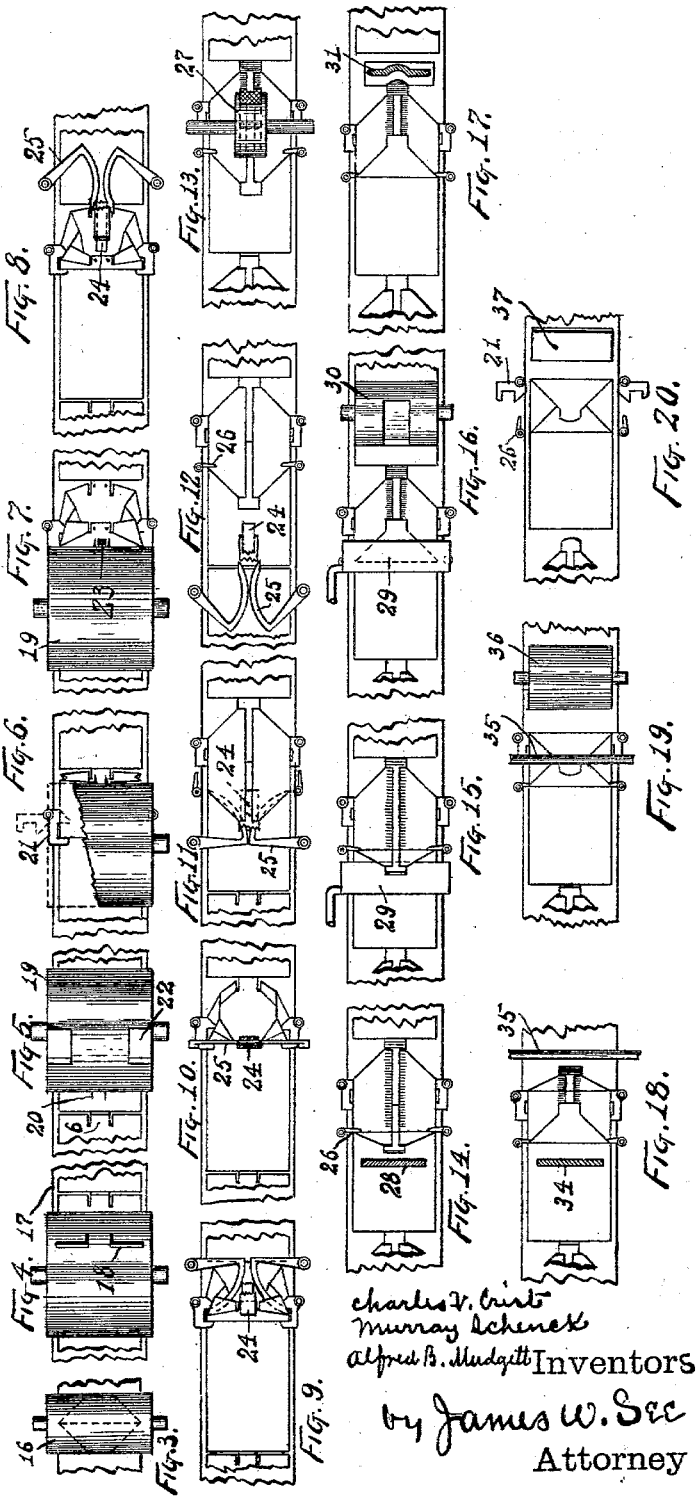
Witnesses:
E. R. Shipley.
M. S. Belden.
Charles V. Crist
Murray Schenck
Alfred B. Mudgett Inventors
by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 2.

Witnesses:
C. R. Shipley
M. S. Belden

Charles V. Crist
Murray Schenck
Alfred B. Mudgett
Inventors by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 3.
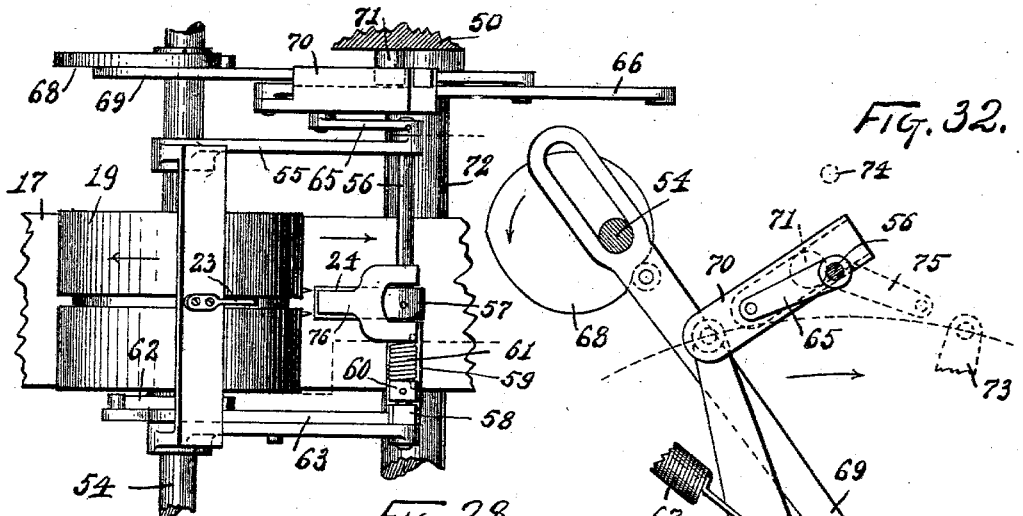
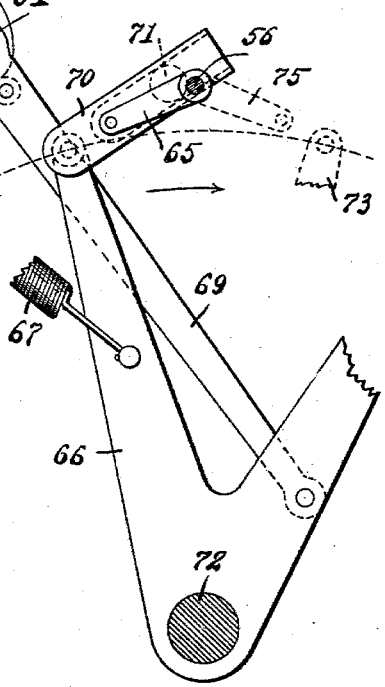
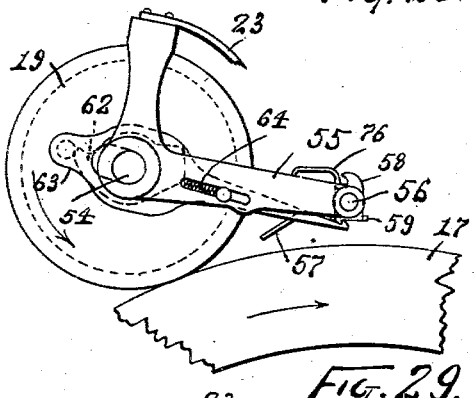
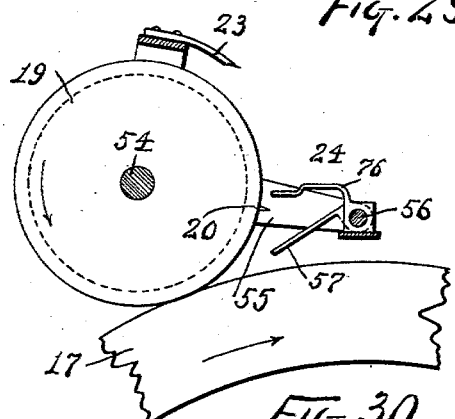
Witnesses:
E. R. Shipley
M. Belden.
Charles V. Crist
Murray Schenck
Alfred B. Mudgett Inventors
by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 4.
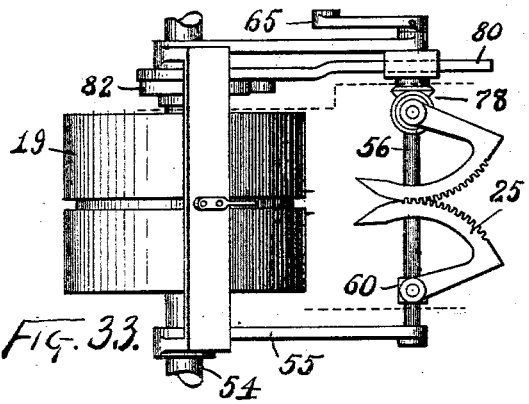
FIG. 33.
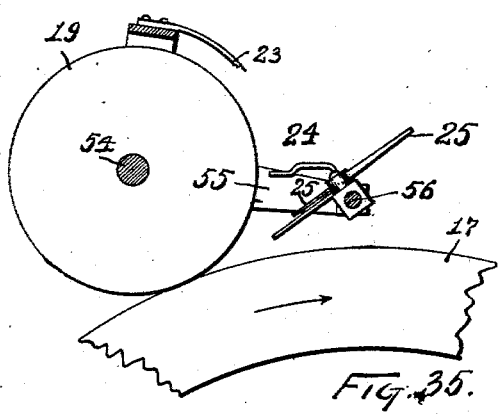
FIG. 35.
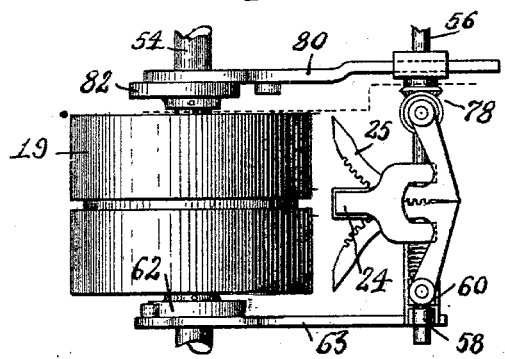
FIG. 34.
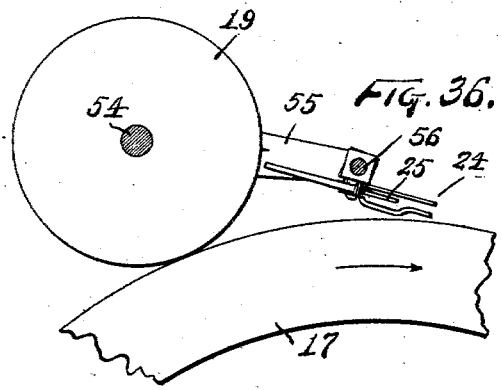
FIG. 36.
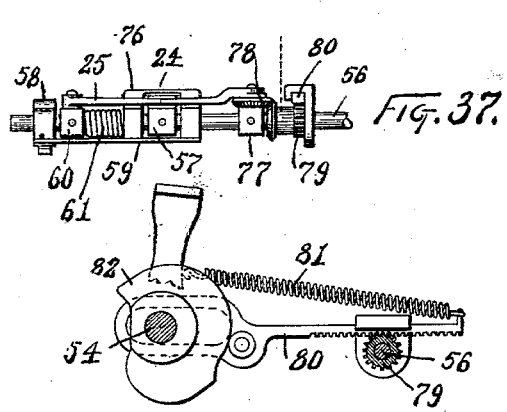
FIG. 37.
FIG. 38.
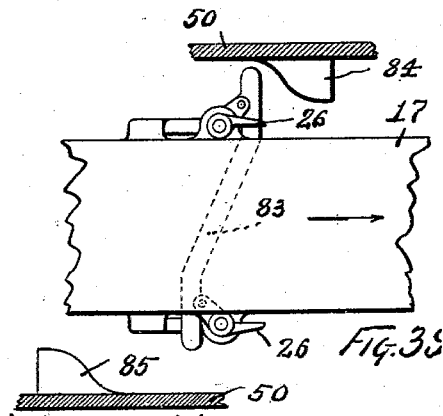
FIG. 39.
Witnesses:
E. R. Shipley
M. S. Belden
Charles V. Crist
Murray Schenck
Alfred B. Mudgett
Inventors
by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 5.

Witnesses:
E. R. Shipley.
M. S. Belden.

Charles V. Crist
Murray Schenck
Alfred B. Mudgett
Inventors by James W. See
Attorney

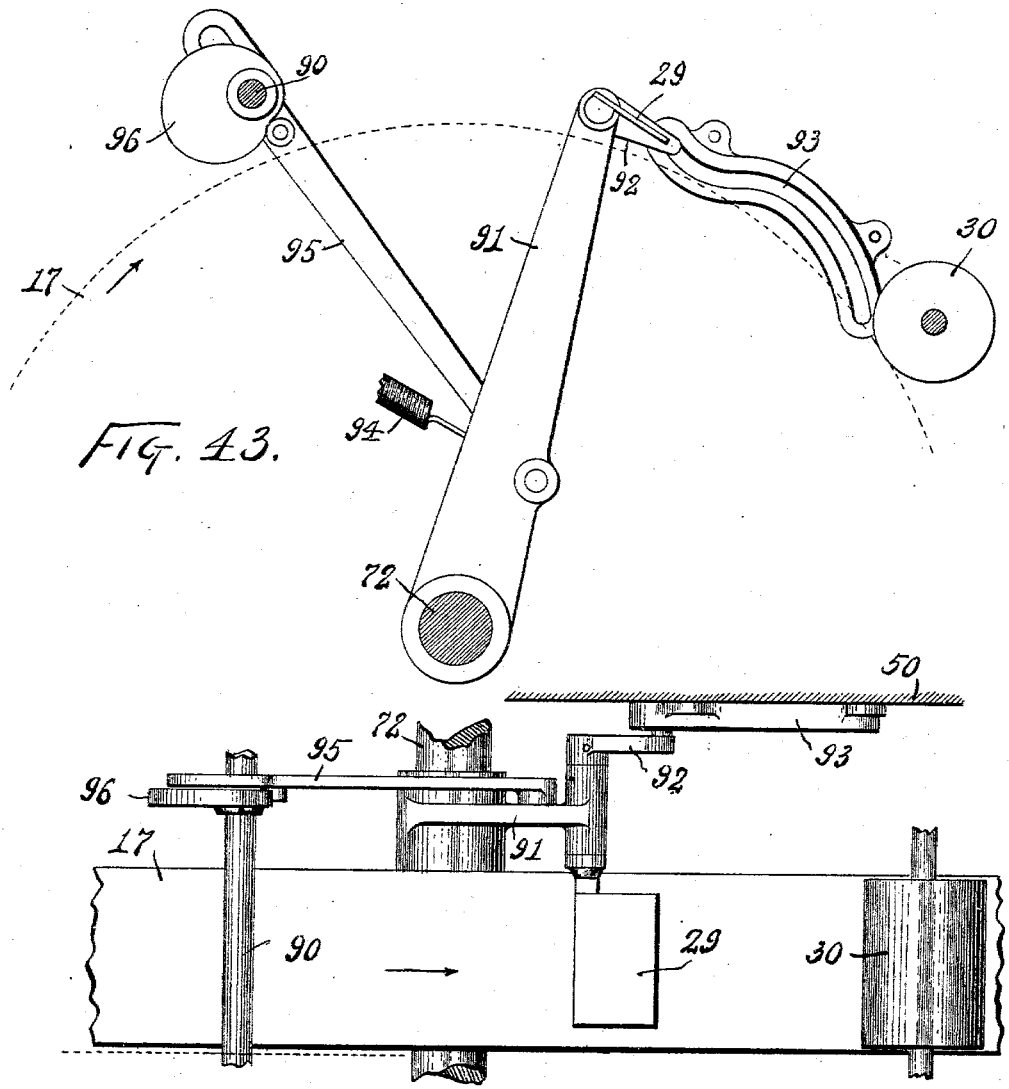

No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 7.

Witnesses:
E. R. Shipley.
M. S. Belden

Charles V. Crist
Murray Schenck
Alfred B. Mudgett
Inventors
by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)
(No Model.) 10 Sheets—Sheet 8.

Witnesses:
E. R. Shipley.
M. S. Belden.

Charles V. Crist
Murray Schenck
Alfred B. Mudgett
Inventors by James W. See
Attorney No. 629,985. Patented Aug. 1, 1899.
C. V. CRIST, M. SCHENCK & A. B. MUDGETT.
PAPER BAG MACHINE.
(Application filed Apr. 3, 1899.)

(No Model.) 10 Sheets—Sheet 9.

Witnesses:
E. B. Shipley.
M. S. Belden.

Charles V. Crist
Murray Schenck
Alfred B. Mudgett
Inventors by James W. See
Attorney

UNITED STATES PATENT OFFICE.

CHARLES V. CRIST, OF CINCINNATI, AND MURRAY SCHENCK AND ALFRED B. MUDGETT, OF MIDDLETOWN, OHIO, ASSIGNORS, BY MESNE ASSIGNMENTS, TO THE UNION BAG AND PAPER COMPANY, OF CHICAGO, ILLINOIS.

PAPER-BAG MACHINE.

SPECIFICATION forming part of Letters Patent No. 629,985, dated August 1, 1899.

Application filed April 3, 1899. Serial No. 711,523. (No model.)

*To all whom it may concern:*

Be it known that we, CHARLES V. CRIST, of Cincinnati, Hamilton county, and MURRAY SCHENCK and ALFRED B. MUDGETT, of Middletown, Butler county, Ohio, have invented certain new and useful Improvements in Paper-Bag Machines, (Case B,) of which the following is a specification.

This invention pertains to improvements in machinery for making paper bags from bellows-folded paper tubing, and the improvements will be readily understood from the following description, taken in connection with the accompanying drawings.

The description will deal, first, with the step-by-step effects to be produced, regardless of instrumentalities; second, with the individual instruments for producing those effects, regardless of their particular relationship to each other and regardless of the particular mechanism for giving the instruments their functional motions; third, with the mechanism for giving the instruments their functional motions, and, fourth, with the machine, representing the instruments, their operating mechanisms, and the general connecting and transmitting mechanism. The drawings have been subdivided with this system of description in view.

Figure 49:
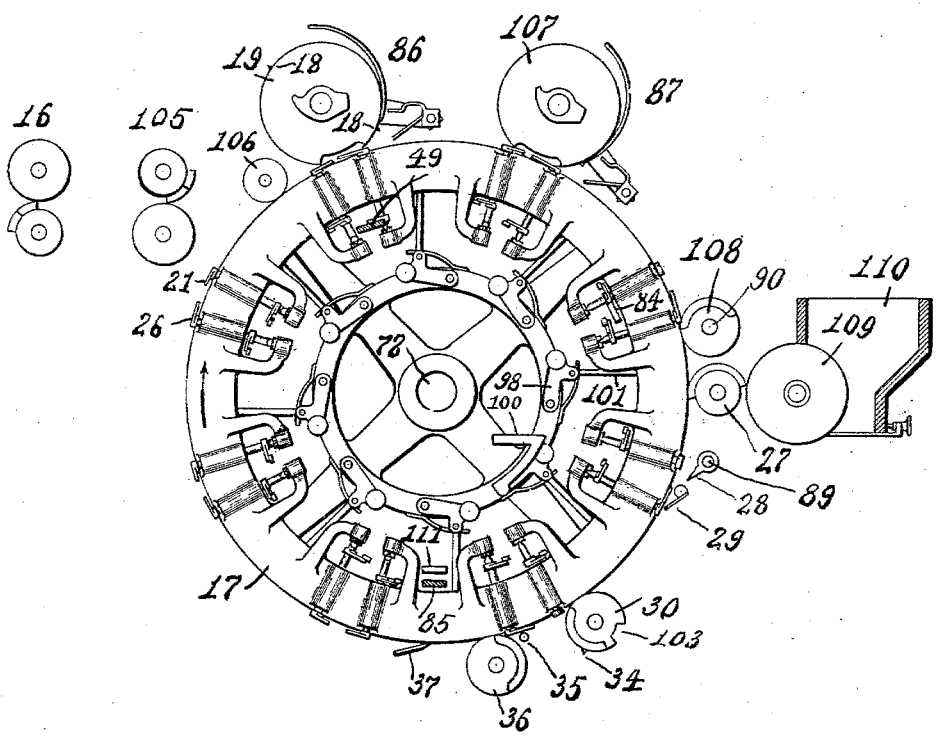
Figure 50:
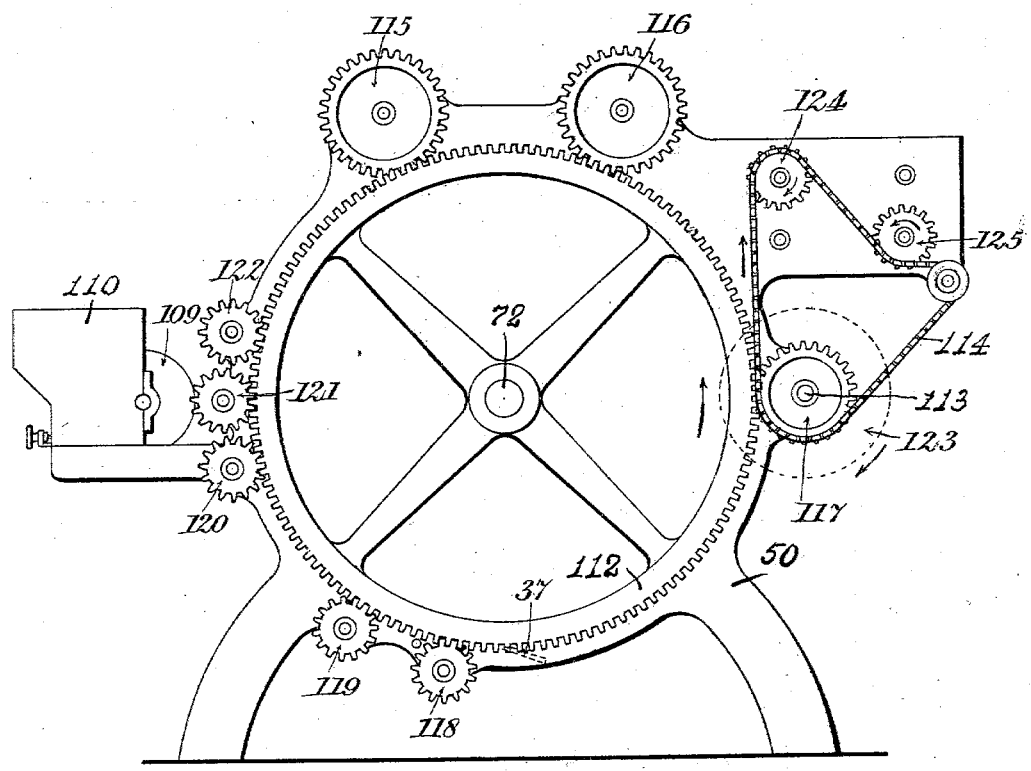
Figure 51:
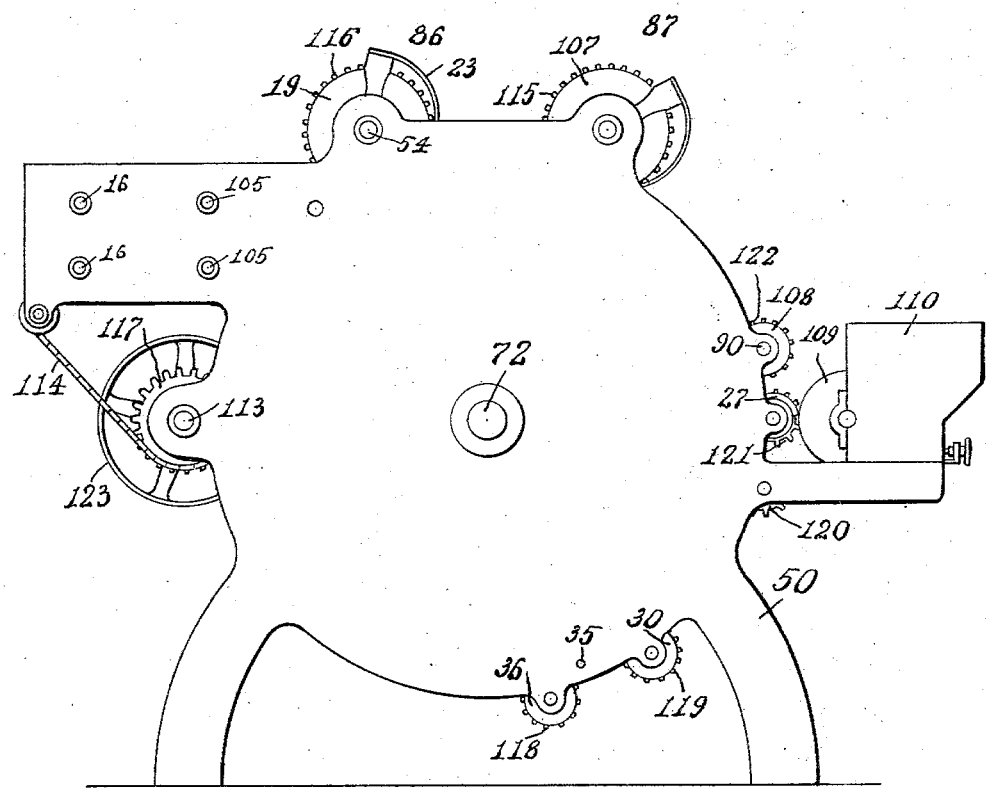

In the accompanying drawings, Figure 1 is a collective view illustrating the program of effects to be produced upon the tube in forming the bags; Fig. 2, a somewhat similar program view, but more correctly illustrating the condition the tube would be in if taken from our machine during a stoppage of operations; Figs. 3 to 20, inclusive, plans illustrating, in proper order of action, the several instruments which operate upon the tube; Figs. 21 to 48, inclusive, views illustrating the several instruments in connection with the mechanisms for giving them their individual functional motions; Fig. 49, a side elevation of the machine with one of the frame sides removed; Fig. 50, an elevation of the opposite side of the machine, showing the transmitting-gearing; and Fig. 51, an elevation of that side of the machine opposite that of Fig. 50.

The figures of the drawings will be more fully described later as their several subject-matters are taken up in detail in systematic order, as heretofore indicated.

*Program of effects,* (see Fig. 1.)—A bellows-folded paper tube 1, of usual cross-section 2, is to be provided at bag-stock intervals of length with cross-slits 3, extending through the upper ply only of the tube. Creases are then to be impressed in the tube-surfaces to define the bottom folds, these creases being impressed in the under and upper faces of the tube and leaving it as indicated at 4. The tube is then to be cut as indicated at 5, these cuts forming outward prolongations of slits 3 to the edges of the tube and also rearward cuts from the ends of slits 3, the cuts now in question being through all the plies of the tube, so that the tube is cut into sections of bag-stock length united by tails at the lower ply. The upper tail 6 is then grasped and raised, thus opening the bag-bottom, as indicated at 8, the lower tail 7 still uniting the bag-section to the bag-section ahead. The opening operation is continued, and the raised tail is carried back and down upon its bag-section, thus giving the diamond fold to the bottom, as at 9. Paste 10 is then applied. Trailing flap 11 is then folded forward and down. The bag ahead of the one being completed is then cut off, as at 12, thus freeing the prow-flap of the bag being completed. In thus cutting the prow-flap from the bag ahead it is cut somewhat in advance of the rear edge of the upper ply of the bag in advance, as indicated at 13, thus providing the mouth of the bag in advance with a finger-notch in one ply to facilitate opening the bag. The prow-flap being thus severed from the bag ahead is to be folded back and down, thus completing the bottom of the bag, as at 14. It is to be understood that the operation of closing down the prow-flap, as at 14, is to be performed before the bag being operated upon is severed from the tube, though of course after the bag ahead of it is severed from it. 15 indicates the completed bag severed from the tube and opened out for use. The modified program illustrated by Fig. 2 is to be ignored for the present.

*Creasing instrument,* (see Fig. 3.)—The creasing is done by feeding the tube through creasing-rolls 16, as usual, a soft roll being opposed to the one having the creasing-blades, the tube going first through a pair of rolls which creases the bottom surface of the tube, and then through a pair of rolls which creases the top surface, the top and bottom creases coming opposite each other, as usual.

*Cross-cutting instrument,* (see Fig. 4.)— The tube lies upon a traveling carrier 17, moving to the right, which carrier, it may here be stated, has preferably the form of a rotary cylinder whose periphery carries the advancing tube. The cross-cuts 5 of Fig. 1 are produced in the advancing tube by causing the tube to travel under a roller having elbow-cutters 18.

*Trail-flap-lifting instrument,* (see Figs. 5 and 6.)—The carrier passes the tube under roll 19, which is provided with pick-up pins 20, the roll being so timed in its motion that the pick-up pins will engage the trailing tail 6 as it passes under the roller. As the tail comes out in front of the roller the pins lift the trailing tail and open the bag-bottom, as in Fig. 6, the pins pulling loose from the prow-tail, which is still involved in the continuous lower ply of the tube.

*Main grippers,* (see Figs. 5, 6, and 7.)—The carrier is provided with grippers 21, one at each edge of the tube, each gripper having two fingers adapted to swing in over the tube edges and hold them down to the carrier. In Fig. 6 the dotted lines show a gripper in idle position, the full lines showing it in gripping position on the tube. The rear fingers of these grippers are to go on top of the tube, thus engaging over all the plies of the bellows folds, while the forward fingers are to engage within the bellows folds and go above the lower plies only thereof, the straight fronts of the rearward fingers defining the center fold of the diamond, while the angular fronts of the forward fingers define angular folds for the bottom of the bag. Roll 19, which carries the pick-up pins 20, has recesses 22 to permit the inward swinging of the grippers as the carrier takes the grippers under the roll. These grippers having gone into action hold the tube to the carrier during most of the subsequent operations.

*Folding-jaws,* (see Figs. 8, 9, 10, 11, and 12.)—Roll 19 having lifted the trailing-tail stationary stripper 23 strips the tail from the pins and permits the tail to drop. The tail, thus free to drop, falls between open jaws 24 of Fig. 8, which stand in position to receive the tail, Fig. 8 showing the tail just ready to drop into the jaws. The jaws having received the tail close upon it and grip it, as in Fig. 9. The jaws having closed upon the tail now turn upwardly and rearwardly, while the tube advances until the trailing flap of the bag stands vertical, as in Fig. 10. The tube still advancing and the jaws still folding rearwardly finally folds the trailing flap down flat upon the tube, as in Fig. 11, in which the jaws 24 are still gripping the flap which it has folded down. The jaws now presenting themselves in a forward direction then open, and the tube proceeds onward, pulling the flap from the jaws, as in Fig. 12, where the flap is seen advanced out of the jaws. These jaws are to turn back to their initial position of Fig. 8 in time to meet the next flap which they are to operate upon.

*Inside spreaders,* (see Figs. 8, 9, 10, 11, and 12.)—As the trailing flap is folded back by the jaws the angular foldings are aided by spreaders 25, seen out of action in Fig. 8. When the jaws grip the flap, as before mentioned, fingers 25 move rearwardly and outwardly, so as to enter the open bottom of the bag and take position at the rear folding corners, as in Fig. 9. When the jaws fold upward and backward in folding the flap, the spreaders 25 accompany the jaws, Fig. 10 showing the spreaders 25 in the vertical plane along with the jaws. Fig. 11 shows the spreaders as having folded clear back along with the jaws. The spreaders then move to non-spreading position, as in Fig. 12, thus permitting the carrier to advance the bag from the spreaders and jaws. The spreaders fold forward to the initial position of Fig. 8 along with the jaws.

*Rear grippers,* (see Figs. 11 and 12.)—Pivoted grippers 26 are carried by the carrier to the rear of main grippers 21 and have fingers adapted to swing inward over the diamond-folded bag-bottom, as in Fig. 12 and hold all bottom plies to the carrier at the rear crossfolding line of the bottom. These rear grippers having engaged remain in engagement till the bag is to be discharged from the machine.

*Pasting instrument,* (see Fig. 13.)—The paste, applied as at 10 of Fig. 1, is applied by an ordinary pasting-roll 27, under which the carrier takes the diamond-folded tube-section.

*Trail-flap creaser,* (see Fig. 14.)—As the carrier advances the bag-section under creasing-blade 28 that blade impresses itself upon the diamond-folded bag-bottom at the rear folding-line of the bottom corresponding with the gripping-points of rear grippers 26. When this creaser 28 rises, the trailing flap springs up somewhat away from the general tube. Fig. 14 shows the parts after blade 28 has produced its crease and the bag-section has advanced from under it and the trailing flap has sprung up.

*Trail-flap folder,* (see Figs. 15 and 16.)— The bag-section advances under a transverse folding-blade 29, and the instant the sprung-up trailing flap passes the blade the blade dips under the flap and moves forward faster than the tube-section, whereby the trailing flap is folded forward, as in Fig. 16, and ready to pass under press-roll 30, which will press the trailing flap down snugly to its place. Folding-blade 29 goes back to original position in time for operation upon the succeeding bag-section.

*Cutting-off instrument*, (see Fig. 17.)—At proper time cutter 31 severs the prow-tail of the bag-section from the bag ahead, thus leaving the prow-flap free to be folded back.

*Prow-flap creaser*, (see Fig. 18.)—As the bag-section advances under creasing-blade 34 that blade descends upon it and gives the bottom the crease for the forward flap. Fig. 18 shows the parts after blade 34 has produced its crease and the bag-section has advanced from the blade.

*Prow-flap folder*, (see Figs. 18 and 19.)— The effect of creasing the prow-flap was to cause the flap to spring somewhat upward from the carrier. As the bag-section advances the prow-flap engages over stationary folding-bar 35 and then doubles under it, as in Fig. 19, thus folding back the prow-flap and completing the bottom formation ready for the pressing action of press-roll 36.

*Discharger*, (see Fig. 20.)—It is to be understood that all of the operations thus far described have been performed upon bag-sections while those sections were an integral part of the tube being operated upon, a bag not being cut off and discharged until it was completed. In Fig. 20 the bag is seen completed, severed from the succeeding bag-section of the tube, the main grippers 21 and rear grippers 26 moved to positions of release, and the bag free for removal from the carrier. Stationary scraper 37 will insure the removal of the finished bag from the advancing carrier.

*Mechanism for actuating the instruments.*— Thus far the functional instruments only have been considered, and needed attention will now be given to the specific construction of the instruments and to the mechanism for actuating them. The carrier 17 is to be assumed as a continuously-rotating cylinder carrying the bag-sections in united procession successively to the instruments which are to act upon the bag-sections.

Figure 22:
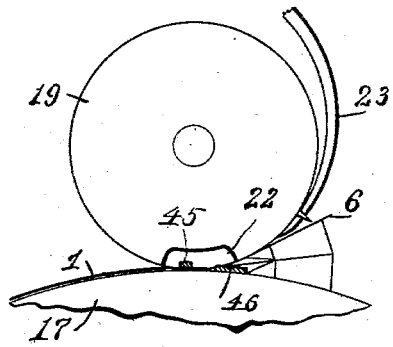
Figure 23:
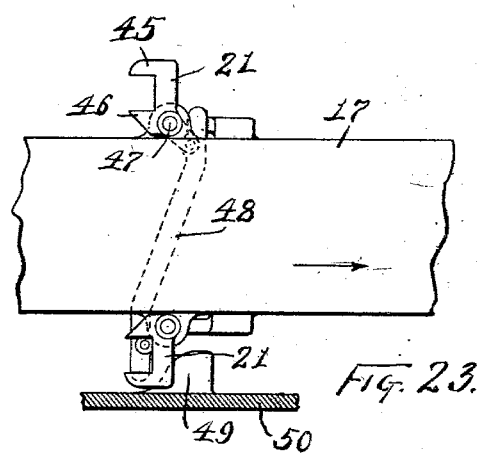
Figure 24:
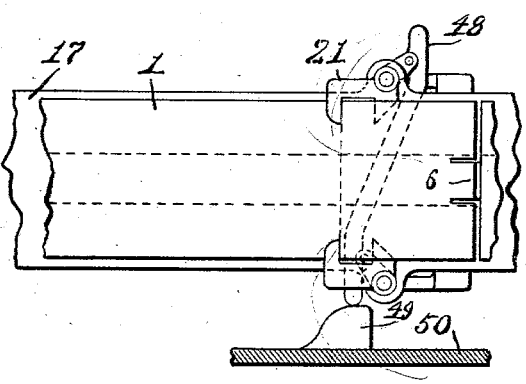
Figure 26:
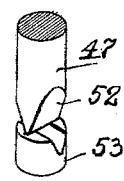
Figures 25, 27:
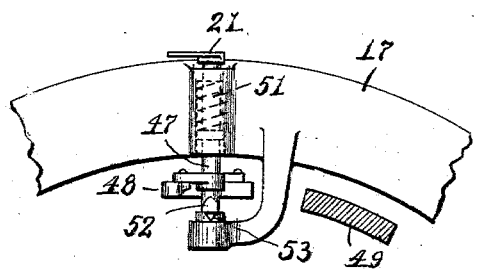

*Actuation of main grippers*, (see Figs. 21 to 27, inclusive.)—From what has been said it is to be understood that main grippers 21 are to swing inwardly at proper time and clamp the tube to the periphery of the carrying-cylinder, the rear fingers of the grippers going above the entire tube, while the forward fingers of the grippers enter between the upper and lower members of the bellows folds, this gripping operation taking place while the bag-section is passing under pick-up roll 19 of Figs. 6 and 7. Fig. 21 shows the pick-up roll in the act of stabbing its pick-up pins into the bag-section; Fig. 22, the same when the picked-up flap 6 has been stripped from the pins and when the main grippers have engaged; Fig. 23, a plan of the cylinder and main grippers in open position; Fig. 24, a similar plan with the grippers in engaged position on the bag-section; Fig. 25, a side view of a part of the cylinder and main gripper mechanism; and Figs. 26 and 27, perspective views of the gripper-spindles in idle and active position, respectively. 45 indicates the rear fingers of the main grippers, the fingers which are to engage over all the plies of the tube; 46, the forward fingers of the main grippers, which fingers are to engage between the upper and lower plies of the bellows folds; 47, the spindles of the grippers, the same being journaled in bearings disposed radially on opposite sides of the cylinder 17; 48, a bar extending across the cylinder and pivoted to arms on the spindles of the grippers in such manner that endwise motion of the bar in one direction opens both grippers and in the other direction closes the grippers; 49, a fixed cam in such position as to be engaged by the front end of the bar 48 as the cylinder turns and push the bar endwise to close the grippers, Fig. 23 showing the bar just reaching the cam, while Fig. 24 shows the grippers after being closed by the action of the cam on the bar; 50, rigid frame parts of the machine; 51, a spring on the spindle of each of the main grippers and tending to press the grippers toward the surface of the cylinder; 52, a wedge-shaped step at the inner end of each of the gripper-spindles, and 53 an angular notch in the step-bearing of each gripper-spindle, so disposed as to be engaged by step 52 when the grippers are turned inwardly to tube-clamping position. Referring to Fig. 25, the grippers 21 are in open position, the spindle-step bridging the notch 53, the fingers of the grippers thus being supported outward some little distance from the periphery of the cylinder. When bar 48 is pushed endwise by cam 49, about a quarter-turn is given to the grippers, thus turning the gripper-fingers inwardly to engage the edges of the tube. As the gripper-spindles thus turn their steps turn into correspondence with the notches in the step-bearings, whereupon springs 51 instantly depress the spindles, the angular engagement of the steps with the notches completing the quick angular motion of the grippers, the fingers at the same time moving down toward the surface of the cylinder. The grippers thus go into action sharply and decisively, turning inwardly to engage the folds of the tube and at the same time moving toward the cylinder-surface to effect the firm clamping of the folds. It may be here stated that when the time comes for the release of the grippers then the rear end of bar 48, Fig. 24, engages a cam similar to cam 49, which opens the grippers, the spindle steps again going to bridging position over their notches, thus raising the fingers from the cylinder. Referring to Fig. 22, at the instant the grippers are to close recesses 22 in roll 19 are over the tube at gripper position, the pick-up pins having lifted the flap of the bag-section. Consequently as the grippers go into clamping position the forward fingers 46 enter below the upper plies of the bellows fold, which have been somewhat separated from the lower plies by the lifting of the flap, while the rear fingers 45 pass inwardly over all of the plies of the bellows fold, thus clamping the bag-section, as indicated in Figs. 6 and 24.

*Actuation of folding-jaws 24*, (see Figs. 28 to 31, inclusive, also Fig. 37.)—Referring to Fig. 28, it is to be remembered from what has been heretofore stated that it is the duty of folding-jaws 24 to receive the trailing flap as it falls from the pick-up pins, close upon that flap, raise the flap, and fold it back flat upon the bag-section, and then to open and permit the bag-section to proceed onward. Fig. 28 is a plan of the folding-jaws 24 and their actuating mechanism, the jaws being in position to receive the flap. Fig. 29 is a side view of the same. Fig. 30 is a similar view with frame parts removed to show the jaws more clearly. Fig. 31 is a view similar to Fig. 30, but showing the jaws at the completion of their folding motion, but before they have opened to release the flap. Fig. 32 is a side view of the fly-arm which gives the folding motions to the jaws, and Fig. 37 is a front view of the shaft on which the folding-jaws are mounted. In the figures now under consideration 54 indicates the shaft of roll 19, before referred to; 55, forwardly-extending arms pivoted on this shaft and rigidly connected together by a cross-bar and forming an oscillating frame; 56, the axial shaft of the folding-jaws 24, journaled in the forward ends of arms 55; 57, the lower one of the folding-jaws, fast on shaft 56; 58, a block loose on shaft 56 and having two teeth and forming, in effect, a ratchet-wheel with two teeth; 59, a bar fast to block 58 and to the upper jaw 76 of the pair 24, which upper jaw is loose on shaft 56, the construction being obviously such that if block 58 be partially turned upon shaft 56 the upper jaw will be given a motion to or from the lower jaw 57; 60, a block fast on shaft 56; 61, a torsional spring coiled on shaft 56 and engaging block 60 and upper jaw 76 and tending at all times to close the upper jaw down against the lower one; 62, a cam fast on shaft 54; 63, a pawl-bar mounted on the oscillating frame and moved rearwardly at certain intervals by cam 62, and 64 a spring holding pawl-bar 63 in normal forward position. Assume shaft 56 to be held against rotation. Lower jaw 57 is fast upon it, while upper jaw 76 is loose upon it, spring 61 clamping the upper jaw to the lower one. If, under such conditions, cam 62 pulls pawl-bar 63 rearward, the tooth of the pawl-bar will engage a tooth of block 58 and turn that block and lift the upper jaw to open position. Fig. 29 shows cam 62 as just having thus opened the jaws, Fig. 30 showing the jaws in open position. The opening action of the jaws is effected entirely by the movement of the upper jaw away from the lower one. When cam 62 ceases to act on the pawl-bar, then spring 61 forces the upper jaw to clamping position against the lower jaw. Cam 62 opens the jaws at the time when the picked-up flap is ready to fall into them and then allows the jaws to close and grip the flap. The flap having been thus gripped, then shaft 56 rises and turns as the bag-section is carried forward under it, the jaws turning below the shaft till they present themselves forwardly, as in Fig. 31, having completed the folding back of the flap. The jaws are now ready to be opened to release the flap, and this is done by the second action of cam 62, causing pawl-bar 63 to engage the second tooth of block 58 and open the jaws, the jaws closing again after releasing the flap and again opening for the new flap after they have gone back to their original rearwardly-presenting position. Attention will now be given to the devices for turning jaw-shaft 56 as the folding of the flap is to take place and as the jaws are to be turned back to original position after the folding. 65 indicates a rearwardly-extending crank-arm fast on shaft 56; 66, a fly-arm loosely pivoted on the shaft 72 of the carrier-cylinder and carrying a pivot at its outer end to the rear of jaw-shaft 56, (see Fig. 32;) 67, a spring urging fly-arm 66 rearwardly; 68, a cam fast on shaft 54; 69, a link connected with fly-arm 66 and actuated by cam 68, so that once in each turn of roll 19 fly-arm 66 will be swept forward at a speed considerably in excess of that of the carrier-cylinder; 70, a link having its rear end pivoted to the outer end of fly-arm 66 and having the rear end of crank-arm 65 pivoted to it forward of fly-arm 66, the outer end of fly-arm 66 being thus coupled to jaw-shaft 56 by crank-arm 65 and link 70; 71, a fixed pin carried by the machine-framing 50 and engaging a longitudinal groove in the outer face of link 70, and 72 the axial shaft of the carrier-cylinder. In Fig. 30 the jaws are open and ready to receive the flap falling from the pick-up pins 20 and to close upon the flap, as before explained. At this time the actuating parts are in the position shown in Fig. 32, fly-arm 66 being up to this time stationary. Cam 68 now effects the forward rocking of fly-arm 66, the result being that the rear end of link 70 is carried forward at higher speed than that of the periphery of the cylinder, thus raising jaw-shaft 56 to the position indicated at 74, oscillating frame 55 rising for this motion of the jaw-shaft. At this instant the jaw-shaft is in its highest position, and the jaws are directly downward, as in Fig. 10, having turned a flap squarely upward, crank-arm 65 having given nearly a quarter-rotation to the jaw-shaft and jaws. Fly-arm 66, continuing its forward motion at excessive speed, finally reaches the position indicated at 73, at which time crank-arm 65 will have turned to the position indicated at 75, which corresponds with the position of the jaws indicated in Fig. 31 and represents the completion of the back folding of the flap. It is now that the jaws open and the carrier takes the bag-section forward, fly-arm 66 returning to the normal position shown in Fig. 32, thus turning the jaws back to original position ready to be opened to receive the next flap. In the movement of the fly-arm fixed pin 71, engaging link 70, causes the proper reversing motion of the link and the proper turning motion of crank-arm 65.

*Actuating of inside spreaders 25*, (see Figs. 33 to 38, inclusive.)—It is to be remembered from what has been explained regarding them that it is the duty of spreaders 25 to enter the mouth of the bag as soon as the folding-jaws shall have gripped the flap and to take position with their points corresponding with the outer extremities of the rear folding-line of the bag-bottom and to remain there during the folding operation and to retreat from the bag-bottom before the folding-jaws release the flap and to accompany the folding-jaws in their folding and returning motions. Fig. 33 shows again the oscillating frame 55, which carries the jaws, the jaws, however, being omitted, this view showing spreaders 25 in initial position. Fig. 34 is a similar view with the folding-jaws present, the spreaders 25 having gone to active position. Fig. 35 is a side view showing the jaws in initial open position, the spreaders 25 being also in initial position—that is to say, not having entered the bag-mouth. Fig. 36 shows the position of jaws after the folding has been completed, the spreaders 25 having retreated out of the bag-mouth, the jaws just opening to release the flap. Fig. 37 is a front view of the jaw-shaft, with the jaws and spreaders. Fig. 38 is a transverse section of the jaw-shaft and side view of the mechanism for spreading and contracting the spreaders. 77, Fig. 37, indicates a block similar to block 60 fast on jaw-shaft 56, the two spreaders 25 having their heels pivoted on trunnions projecting from these blocks, the curved bodies of the spreaders forming intermembering tooth-segments, so that if angular motion be given to one spreader upon its pivot the other spreader will have corresponding motion; 78, bevel-gears, one on the heel of one of the spreaders and the other loose on jaw-shaft 56; 79, a spur-pinion fast with the bevel-gear last referred to; 80, a rack engaging pinion 79 and extending rearwardly to guiding engagement with shaft 54 of roll 19; 81, a spring engaging oscillating frame 55 and rack 80 and tending to draw the rack rearwardly and urge the spreaders to contracted position, and 82 a cam fast on shaft 54 and operating on rack 80 to push it forward and move the spreaders to spread position. The heels of the pair of jaws 24 are separated from each other, and the heel of the upper jaw is forked, so that the bodies of the spreaders 25 can work outwardly sidewise from between the rear portions of the jaws, as seen in Figs. 34 and 37. Blocks 60 and 77, to which the spreaders are pivoted, being fast on the jaw-shaft along with lower jaw 57, it follows that the spreaders must partake of the folding motion of the jaws as the shaft is turned. Normally the spreaders have the retreating position shown in Figs. 33 to 35. The jaws having received and closed upon the flap, cam 82 pushes rack 80 forward against the resistance of spring 81, thus causing the spreaders to go to the active position indicated in Fig. 34. Then when the jaws make their folding motion they are accompanied by the spreaders in spread position. When the folding has been completed, then cam 82 permits the spreaders to go to their contracted position, after which the jaws open and the bag-section moves onward, as in Fig. 12, the jaw-shaft then turning back and carrying the spreaders and jaws to initial position ready for the next flap.

*Actuation of rear grippers 26*, (see Figs. 11, 12, and 39.)—As soon as the folding-jaws have folded back the flap the rear grippers 26 move inwardly over the bag-bottom and clamp down upon the same at the folding-line of the trailing flap, as has been before explained. The rear grippers 26 are like and mounted like the main grippers, so that Figs. 25, 26, and 27 will serve in illustrating them, it being understood, however, that rear grippers 26 have but a single clamping-finger each. In Fig. 39, 83 indicates the link-bar connecting the opposite grippers, while 84 is the fixed cam for closing the grippers at proper time, and 85 is the fixed cam for opening the grippers. The grippers are shown open and just ready to engage cam 84 and be closed. As the grippers are carried around by the cylinder the front end of bar 83 will eventually engage cam 85 below the axis of the cylinder, and the grippers will then be opened. These rear grippers have the spring clamping action of the main grippers, as explained in connection with Fig. 25, &c.

*Duplication of the folders.*—Assume the procession of united bag-sections to be moving along under the series of devices which are to act upon the bag-sections and assume that all of these devices make an active impulse at the passage of each bag-section. In such case no bag-section would escape being acted upon by each of the instruments. As thus considered the program of effects illustrated in Fig. 1 would be correct. Notice in that program that at 8 a bag-section is partially opened, that at 9 the bottom-folding is completed, and that at 10 the paste is applied. Now, returning to Figs. 30 and 31, representing the folding-jaws in initial and terminal position, let it be assumed that this folding mechanism is so timed as to operate each time a bag-section is carried under it by the cylinder. This would mean that the jaws would be as in Fig. 30 and would receive the flap of the approaching bag-section, that the jaws would grip the flap and fold it back as the bag-section advanced, the jaws finally reaching the position shown in Fig. 31, and that the jaws having thus completed their folding work would need to turn back again to the position of Fig. 30 in time to deal with the flap of the next bag-section; but the bag-sections are comparatively short, and their speed of advance is as rapid as is practicable, and all the devices, except the folder, are capable of dealing with the bag-sections in rapid succession; but the folder has rather complex movements, and it is not practicable after the folding parts have finished their work to get them back to initial position quick enough to deal with the succeeding bag-section. We therefore duplicate the folding devices and cause them to act in unison, but so time their actions with relation to the other devices that they will act only at times corresponding with the passage of two bags. In other words, the two folders act simultaneously on contiguous bag-sections and then rest until the procession has advanced two steps, so to speak, whereupon the folders go into simultaneous action on two new bag-sections. This being the case, the program is somewhat modified, as will be understood from Fig. 2, representing the tube at a stoppage of the machine. It is to be observed that at 41 we have two bag-sections completely folded, while the procession contains only one bag-section in any other specific individual condition. The folders having thus done their work upon two bag-sections need do no more work till the procession advances two steps, the first uncompleted bag-section passing idly under the first folder and taking position under the second folder.

Figure 40:
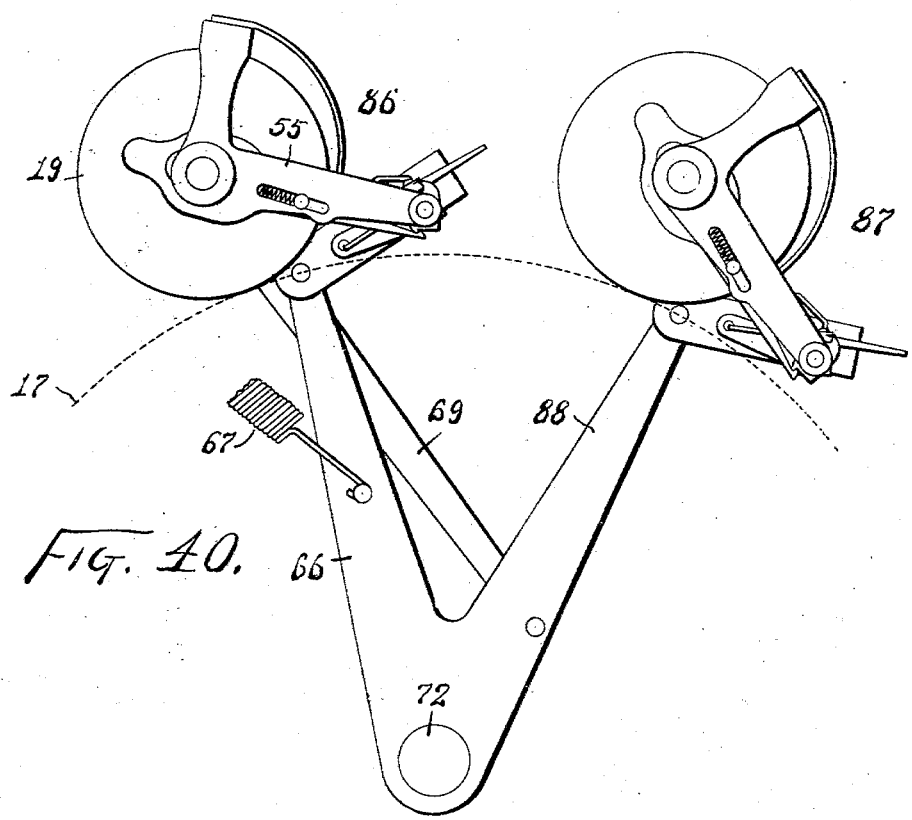
Figure 41:
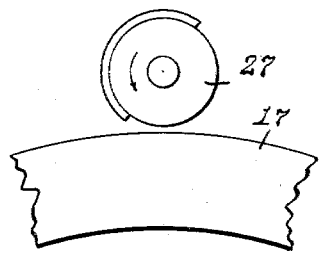
Figure 42:
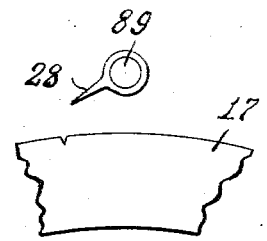

Fig. 40 illustrates the relationship of the two folding devices. In this figure, 86 indicates the complete folder, which has been heretofore described in detail and which may now be considered as the first folder; 87, the second folder, being a duplicate of the first one and arranged upon the carrier one bag-section length ahead of the first carrier, and 88 the fly-arm for operating the second folder, being unified and working in unison with the first fly-arm 66. Roll 19 of each folder has a circumference equal to two lengths of bag-stock, and it follows that the folders while working in unison will operate only during alternate steps of advance of the procession of bag-sections. The two pairs of folding jaws and spreaders having completed their work upon their respective bag-sections have plenty of time to return to initial position ready for action on the new bag-sections on which they are to respectively operate.

*Actuation of the pasting devices*, (see Figs. 13, 41, and 49.)—The paste is applied by paste-roll 27, acting in conjunction with a distributing-roll and paste-fountain, and presents no novelty.

*Actuation of trail-flap creaser 28*, (see Figs. 14 and 42.)—Creasing-blade 28 descends on the rear cross-folding line of the bag-bottom, operating in conjunction with a suitable creasing-notch in the cylinder. The blade is secured radially to the shaft 89 to make one turn at the passage of each bag-section and impress the crease in line with rear grippers 26.

*Actuation of trail-flap folder 29*, (see Figs. 15, 16, 43, and 44.)—In Figs. 43 and 44, 29 is the folding-blade, which is to engage under the sprung-up trailing flap and then advance at speed in excess of that of the cylinder, thus folding the flap forward and down and tucking it under press-roll 30. 90 indicates a shaft to the rear of blade 29; 91, a fly-arm loosely pivoted on the main shaft 72 of the cylinder, its outer end having journaled in it the spindle secured to the heel of folding-blade 29; 92, a crank-arm fast on this spindle; 93, a grooved cam fixed to the framing 50 of the machine and engaged by the forward end of crank-arm 92, the groove of this cam lying generally parallel with the periphery of the cylinder, but dipping toward the cylinder and then rising from the cylinder and then again approaching the cylinder at roll 30; 94, a spring engaging fly-arm 91 and urging it rearwardly; 95, a link pivoted to fly-arm 91 and extending into guiding engagement with shaft 90, and 96 a cam on shaft 90 and engaging link 95 and serving at the passage of each bag-section to move fly-arm 91 forward at speed in excess of that of the cylinder. Normally folding-blade 29 is in the position shown in Fig. 43. The sprung-up trailing flap of the bag-section passes beneath the blade and springs up in advance of it. At this time the blade moves forward at speed higher than that of the flap, the blade advancing under the flap and moving toward the cylinder, thus bending the flap forward, the blade as it advances upon the flap moving outwardly, so as to deal with the flap near its tail, whereupon the blade again approaches the cylinder, the result being that the flap is folded forward upon the bag-bottom and the tail tucked under press-roll 30, which presses the trailing flap home.

Figure 45:
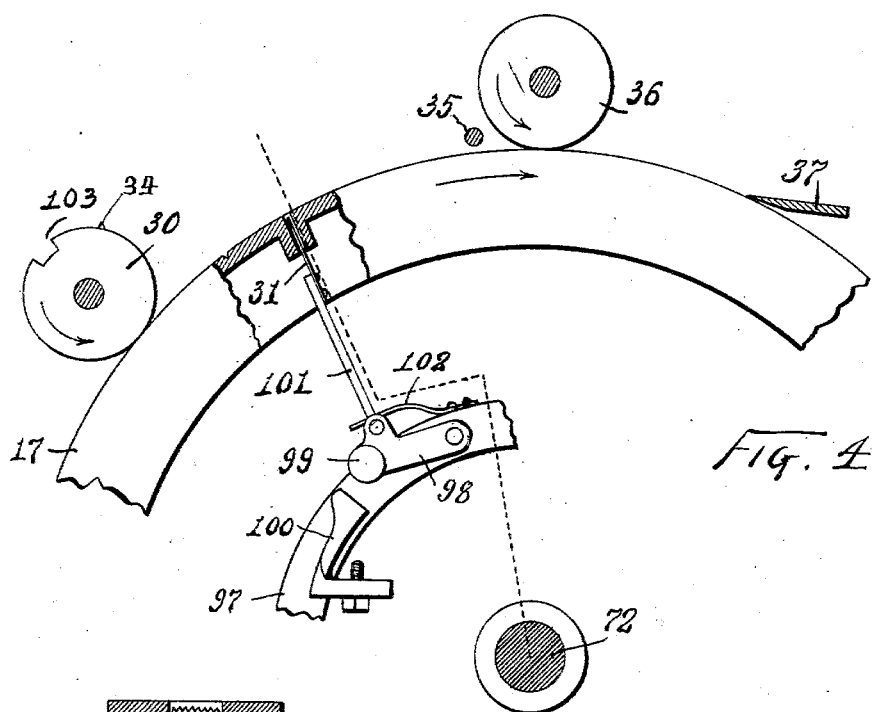
Figure 46:
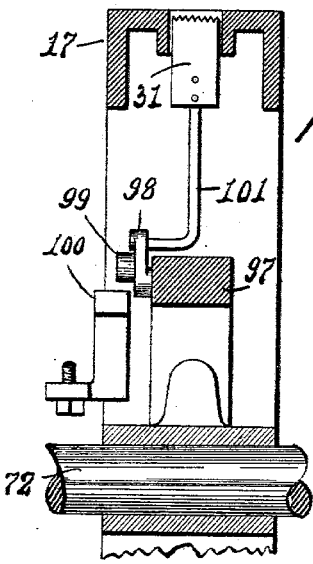
Figures 47, 48:
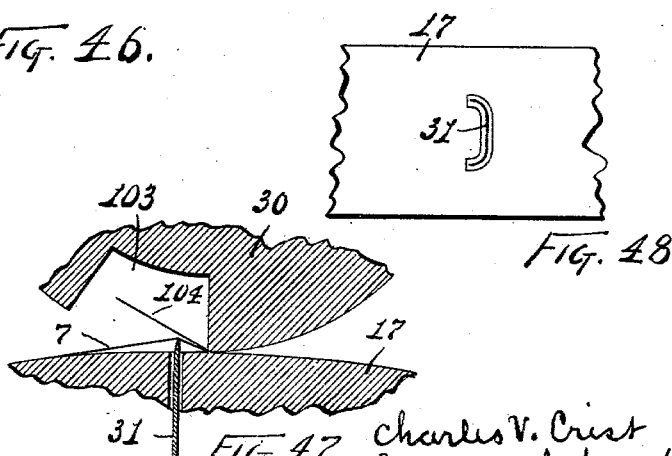

*Actuation of prow-flap cutter 31*, (see Figs. 17, 45, 46, 47, 48, and 49.)—It is the duty of the prow-flap cutter to sever the completed bag from the succeeding bag-section, so that the prow-flap of the latter is free to be folded back upon the bag-bottom. This cutter is carried by the cylinder and works outwardly and severs the prow-tail of the bag a trifle in advance of the rear edge of the upper ply of the finished bag, so as to produce a finger-notch at the mouth of the finished bag. Referring to Figs. 45 to 48, inclusive, 97 indicates an inner concentric ring on the carrier-cylinder, the carrier-cylinder consisting of a hub, the main rim, the ring in question, and uniting-arms; 98, an arm pivoted to the side of ring 97; 99, a pin or roller projecting out from the rear end of this arm; 100, a fixed cam secured to the framing of the machine and adapted to be engaged by roller 99 as the cylinder turns forward, the effect being to swing arm 98 suddenly outward; 101, a shank pivoted to arm 98 and projecting toward the periphery of the cylinder and carrying at its outer end the cutter 31, which works outwardly through a mortise in the rim of the cylinder, the cutter having such curved form as is desired for the finger-notch; 102, a spring carried by ring 97 and urging arm 98 and the cutter to inward position; 103, a notch across press-roll 30 in position to come opposite cutter 31 as the cutter passes under the roll, Fig. 45 showing the cutter after it has passed the roll and retreated after its cutting action, and 104, Fig. 47, the rear end of the upper ply of the completed bag at the time the prow-flap of the succeeding bag-section is being cut therefrom. As roller 99 passes cam 100 the cutter 31 will be suddenly projected outward, spring 102 instantly returning it to normal inward position. The action of the cutter may be best understood from Fig. 47, where the cutter is just making its cutting stroke. Notch 103 in roller 30 is just over the cutter, and the lower prow-flap 7, which is to be cut, is still united to the lower ply of the bag ahead, the bag-sections being still clamped to the cylinder by the grippers. The consequence is that the lower ply of the tube, involving prow-tail 7, is under strain over the mortise in which cutter 31 works, while the upper ply 104 of the bag ahead is free to turn up into notch 103. As cutter 31 rises it severs the prow-tail 7 from the bag ahead, upper ply 104 yielding upwardly, thus permitting the cutting of the lower ply to take place ahead of the rear edge of upper ply 104 of the advanced bag, whereby the finger-notch is produced.

*Prow-flap folder 35*, (see Fig. 45.)—The prow-tail having been severed from the bag ahead and the prow-crease having been produced by creaser-blade 34, carried by roll 30, the sprung-up flap strikes fixed folding-bar 35, resulting in the prow-flap being folded back upon the bag-bottom as it passes under press-roll 36, the completed bag being stripped from the cylinder by blade 37 and discharged from the machine.

*The machine*, (see Figs. 49, 50, and 51.)— The carrier-cylinder 17 is of such diameter that its circumference is a multiple of the bag-stock length, the drawings showing the cylinder as corresponding with eight lengths of bag-stock and being provided correspondingly with eight sets of main grippers, rear grippers, and cutters. The tube comes from the left to creasing-rolls 16, which crease the lower surface of the tube, goes then to creasing-rolls 105, which crease the upper surface of the tube opposite the previous creases, goes then under guide-roll 106 into contact with the carrier-cylinder, and then in its various stages of bag completion lies around the cylinder to discharging-stripper 37. Roll 19, making a half-turn for each bag-section, carries two sets of cross-cutters 18, so that it produces the cross-cuts 5 for all of the bag-sections. This roll carries but one set of pick-up pins, and therefore thus deals with alternate bag-sections only. First folding device 86, collectively considered, deals with these alternate bags. Second folding device 87 deals with the intermediate bags, its pick-up roll 107 having no cross-cutters and having one set of pick-up pins. The pick-up roll 107 of the second folding device 87 acts as the press-roll for the diamond folds produced by first folding device 86. The diamond folds produced by the second folding device 87 are pressed by press-roll 108 on shaft 90. Further along are disposed in order the paste-roll 27, the trailing-flap creaser 28, the trail-folder 29, press-roll 30, which serves in pressing the trailing flap after folding and which serves also as the opposing roll for the cutters carried by the cylinder and which serves also as the prow-flap creaser, carrying creaser-blade 34, prow-flap-folding rod 35, press-roll 36 for the prow-flap, and discharging-stripper 37. All of the rolls are appropriately recessed in their peripheries to permit of the passage of the grippers. Grippers approaching guide-roll 106 are in open condition. As the grippers pass under roll 19 of the first folder fixed cam 49 closes the main grippers. Rear grippers are closed by fixed cam 84 after the bag-sections leave the second folder 87. After the bag-sections have passed final press-roll 36 and before the completed bags reach discharging-stripper 37 the main grippers and rear grippers are opened by fixed cams 111 and 85, respectively. The severing of the prow-tail from the completed bag ahead takes place as a cutter passes roll 30, fixed cam 100 operating on the cutter mechanism at this point. The bags being in succession completed as they pass final press-roll 36 and the main grippers and rear grippers having been opened, discharging-stripper 37 insures the removal of the bags from the cylinder.

*Connecting-gearing*, (see Figs. 49, 50, and 51.)—The main shaft 72 of the cylinder has fast upon it the master-gear 112. The driving-shaft 113 carries a pulley 123, by means of which power may be imparted to the shaft, and also carries a pinion 117, gearing into the master-wheel, whereby rotary motion is imparted to the cylinder. The first folding device 86 is driven by a pinion 116, gearing with the master-gear, and the second folding device 87 is driven by a pinion 115, similarly gearing with the master-gear, these two pinions 115 and 116 being of such diameter with reference to that of the master-gear 112 as to give each folding device an impulse at the passage of every other bag-section, as has been before explained. Chain 114 drives the two pairs of creasing-rolls by means of sprocket-wheels 124 and 125 and one on driving-shaft 113. Press-roll 108 is driven by pinion 122, gearing with master-gear 112. Paste-roll 27 is driven by pinion 121, gearing with the master-gear. Trailing flap 28 is driven by pinion 120, gearing with the master-gear. Press-roll 30 is driven by pinion 119, gearing with the master-gear. Prow-flap press-roll 36 is driven by pinion 118, gearing with the master-gear. Pinions 118, 119, 120, 121, 122, 124, and 125 and the parts operated by them turn once for each bag-section, while pinions 115 and 116 and the folding devices operated by them turn at half that rate, as before explained.

We claim as our invention—

1. In a paper-bag machine, the combination, substantially as set forth, of a carrier arranged to receive a paper tube and give advancing motion to the same, grippers pivoted at the opposite edges of the carrier and having fingers adapted to swing inwardly over the surface of the carrier and then move toward the surface of the carrier, springs tending to press the fingers toward the surface of the carrier when the fingers are over the carrier-surface, and mechanism for intermittently turning said grippers to idle and active position.

2. In a paper-bag machine, the combination, substantially as set forth, of a carrier arranged to receive a paper tube and give advancing motion to the same, grippers pivoted at the opposite edges of the carrier and having fingers adapted to swing inwardly over the surface of the carrier and then move toward the surface of the carrier, springs tending to press the fingers toward the surface of the carrier when the fingers are over the carrier-surface, mechanism for intermittently turning said grippers to idle and active position, and a connecting-bar extending across the carrier and connecting the opposite grippers.

3. In a paper-bag machine, the combination, substantially as set forth, of a carrier adapted to receive and advance a paper tube, a spindle-bearing at the side of the carrier, a spindle journaled in said bearing and adapted for rotary and endwise motion therein, a finger on the outer end of said spindle adapted to move to a position over the surface of the carrier as the spindle turns, a spring urging said spindle inwardly to draw the finger toward the carrier-surface, a notched step-bearing for said spindle, and a wedge-shaped toe for said spindle adapted to bridge said notch when said finger is in idle position and to descend into the notch under the influence of said spring when the finger is over the carrier-surface.

4. In a paper-bag machine, the combination, substantially as set forth, of a carrier adapted to receive and advance a paper tube, a spindle-bearing upon each edge of the carrier, gripper-spindles mounted in said bearings and adapted for rotary and endwise motion therein, a bar connecting said spindles to cause them to turn in unison, notched step-bearings for said spindles, fingers on the outer ends of the spindles, wedge-shaped toes for the spindles adapted to bridge said notches when the fingers are in idle position and to enter the notches as the fingers go to active position, and springs arranged to urge the spindle-toes into the notches.

5. In a paper-bag machine, the combination, substantially as set forth, of a carrier adapted to receive and advance a bellows-folded paper tube, a spindle-bearing at the edge thereof with its axis substantially at right angles to the surface of the carrier, a gripper-spindle journaled therein, and a pair of fingers carried by said gripper-spindle and adapted, when the spindle is turned, to move inwardly over the surface of the carrier and engage, respectively, over the lower plies and all of the plies of the bellows fold of the tube.

6. In a paper-bag machine, the combination, substantially as set forth, of a carrier adapted to receive and advance a bellows-folded tube, a roll coöperating therewith and having a peripheral recess, pick-up pins carried by said roll and adapted to engage and pick up and partially open the flap of the bag-section as it is carried under said rolls, a stripper adapted to discharge the flap from the pick-up pins, a pair of gripper-fingers arranged to move inwardly over the edge of the carrier at the recess in said roll and to engage, respectively, over and under the upper plies of the bellows fold of the tube.

7. In a paper-bag machine, the combination, substantially as set forth, of a carrier adapted to receive and advance a bellows-folded paper tube, a roll disposed across the carrier to press the tube thereto, pick-up pins in the periphery of said roll and adapted to engage and raise the upper flap of the tube, a shaft disposed across the carrier in advance of said roll, folding-jaws mounted on said shaft in position to receive the flap falling from said pick-up pins, and mechanism for opening and closing said jaws and for raising and lowering and turning said shaft.

8. In a paper-bag machine, the combination, substantially as set forth, of a carrier adapted to receive and advance a bellows-folded paper tube, a press-roll coöperating therewith, pick-up pins carried by said press-roll, a frame arranged to oscillate on the axis of said roll, a shaft journaled in the free extremity of said frame, a folding-jaw fast on said shaft, a folding-jaw pivoted on said shaft, mechanism for turning said pivoted jaw on said shaft, and mechanism for raising and lowering and turning said shaft.

9. In a paper-bag machine, the combination, substantially as set forth, of a carrier adapted to receive and advance a bellows-folded paper tube, a press-roll coöperating therewith, pick-up pins carried by said roll, a shaft disposed in advance of said roll and carrying a pair of folding-jaws, an oscillating frame for the support of said shaft, a crank-arm on said shaft, a fly-arm carrying a pivot near the extremity of said crank-arm, a grooved link connecting said crank-arm with said pivot of the fly-arm, a fixed pin engaging the groove of said link, and a cam connected with said fly-arm and adapted to reciprocate the pivot of the fly-arm and give it an advancing motion at speed in excess of that of said carrier.

10. In a paper-bag machine, the combination, substantially as set forth, of a carrier adapted to receive and advance a bellows-folded paper tube, a press-roll coöperating therewith, an oscillating frame, a shaft journaled in the free extremity of said frame, a folding-jaw fast on said shaft, mechanism for raising and lowering and turning said shaft, a folding-jaw pivoted on said shaft, a double-toothed block pivoted on said shaft and connected with said pivoted jaw, a pawl-bar adapted to engage the teeth of said block, and a cam arranged to give endwise motion to said pawl-bar.

11. In a paper-bag machine, the combination, substantially as set forth, of a carrier adapted to receive and advance a bellows-folded paper tube, a press-roll coöperating therewith, a shaft in advance of said roll and arranged for oscillatory motion to and from the carrier, folding-jaws carried by said shaft and adapted to grip and fold back the trailing flap of a bag-section of said tube, and a pair of inside spreaders carried by said shaft and adapted to coöperate with said jaws.

12. In a paper-bag machine, the combination, substantially as set forth, of a carrier adapted to receive and advance a bellows-folded paper tube, a press-roll coöperating therewith, a shaft in advance of the press-roll, folding-jaws carried by said shaft, and inside spreaders having their heels pivotally connected with said shaft and having toothed arc-shaped arms gearing together.

13. In a paper-bag machine, the combination, substantially as set forth, of a carrier adapted to receive and advance a bellows-folded paper tube, a press-roll coöperating therewith, a shaft in advance of said roll, a pair of folding-jaws carried by said shaft, a pair of inside spreaders geared together for movement in unison having their heels pivotally connected with said shaft, a bevel-gear on the heel of one of said spreaders, a bevel-gear loose on the shaft and gearing with the first-mentioned bevel-gear, a spur-pinion loose on the shaft and fast with the last-mentioned bevel-gear, a rack engaging said spur-pinion, and a cam arranged to give endwise motion to said rack.

14. In a paper-bag machine, the combination, substantially as set forth, of a carrier adapted to receive and advance a bellows-folded paper tube, a folding device coöperating therewith to form the diamond folds of the bag-bottoms, a press-roll in advance of the folding device, a folding-blade to the rear of said press-roll and having a pivoted shank at its rear edge, a crank-arm on said shank, a fixed cam engaging said crank-arm, a fly-arm carrying said pivoted shank, and a cam connected with said fly-arm and adapted to reciprocate said pivoted shank and give it a forward motion at higher speed than that of said carrier.

15. In a paper-bag machine, the combination, substantially as set forth, of a carrier adapted to receive and advance a paper tube and provided with a mortise for a flap-cutter, a press-roll coöperating with the carrier and having a notch adapted to come over said mortise, a flap-cutter advancing with said carrier and adapted for movement through said mortise and into said notch, and a cam arranged to project said cutter beyond the face of the carrier when the notch is opposite the cutter.

16. In a paper-bag machine, the combination, substantially as set forth, of a carrier adapted to receive and advance a bellows-folded paper tube, cutting, pasting and flap-folding devices disposed in series along the path of said carrier and arranged to produce their effects at successive intervals represented by the passage of the successive bag-sections advanced by the carrier, and a pair of folding devices adapted to form the diamond folds of the bag-sections and disposed contiguous to each other behind the pasting device and arranged to produce their active effects simultaneously but only during the alternate intervals of action of the cutting and pasting devices.

17. In a paper-bag machine, the combination, substantially as set forth, of a rotary carrying-cylinder, a series of sets of grippers carried thereby, a series of cutters carried thereby in number equal to the sets of grippers, cutting, pasting and folding devices arranged in series around the periphery of said cylinder, and fixed cams arranged to close all the grippers and to open them and to operate all said first-mentioned cutters once in each turn of said cylinder.

18. In a paper-bag machine, the combination, substantially as set forth, of a rotary carrier-cylinder, a first press-roll coöperating therewith, pick-up pins on said press-roll, a diamond-folding device coöperating with said press-roll, a second press-roll in advance of said folding device and adapted to press the diamond folds produced by it, a second diamond-folding device in advance of said second press-roll, and a third press-roll in advance of said second diamond-folding device and adapted to press the diamond folds produced by both said folding devices.

CHARLES V. CRIST.
    MURRAY SCHENCK.
    A. B. MUDGETT.

Witnesses as to Crist:
 AXEL N. BRUZELIUS,
 VICTOR H. KNAPP.

Witnesses as to Schenck and Mudgett:
 SAM D. FITTON, Jr.,
 M. S. BELDEN.